US006540136B1

(12) United States Patent
Ross

(10) Patent No.: US 6,540,136 B1
(45) Date of Patent: Apr. 1, 2003

(54) REPLENISHMENT ARRANGEMENTS FOR AUTOMATED TELLER MACHINES

(75) Inventor: Ian Ross, Dundee (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/481,768

(22) Filed: Jan. 11, 2000

(30) Foreign Application Priority Data

Jan. 15, 1999 (GB) ........................................... 9900789

(51) Int. Cl.[7] ............................................... G06F 17/60
(52) U.S. Cl. ......................... 235/379; 235/385; 902/13
(58) Field of Search ................................ 235/379, 385, 235/486; 902/12, 13, 30; 705/1, 35

(56) References Cited

U.S. PATENT DOCUMENTS 4,370,006 A * 1/1983 Graef et al. ................ 312/215
4,795,889 A 1/1989 Matuura et al.
4,980,543 A * 12/1990 Hara et al. .................. 235/379
5,076,441 A * 12/1991 Gerlier ....................... 235/379
5,105,364 A * 4/1992 Kawamura et al. ......... 364/478
5,313,050 A * 5/1994 Hiroki et al. ............... 235/379
5,563,393 A * 10/1996 Coutts ........................ 235/379
5,804,804 A * 9/1998 Fakatsu ...................... 235/379
6,109,522 A * 8/2000 Force et al. ................ 235/379
6,378,770 B1 * 4/2002 Clark et al. ................. 235/379

FOREIGN PATENT DOCUMENTS

EP 0845763 6/1998
EP 0881605 12/1998
GB 2244838 12/1991

* cited by examiner

*Primary Examiner*—Daniel St. Cyr
(74) *Attorney, Agent, or Firm*—Francis L. Conte

(57) ABSTRACT

An automated teller machine (ATM) includes a number of currency note holding cassettes 40. The notes are transferred to a dispensing slot 18 via paths 46 and 48. Mispicked notes are detected by multiple note detector 58 and diverted to reject bin 60 via diverter 56. When cassette contents reach a low level and require replenishment, notes are transferred from cassettes 40 via paths 45 and 91 by means of diverter 93 into a secure purge bin 90. Empty cassettes can be removed and replenished whilst the bin carrying the remaining notes is transferred for emptying by secure transportation.

20 Claims, 5 Drawing Sheets

REPLENISHMENT ARRANGEMENTS FOR AUTOMATED TELLER MACHINES

BACKGROUND OF THE INVENTION

This invention relates to replenishment arrangements for automated teller machines (ATMs).

In conventional ATMs, stacks of currency notes are stored in one or more currency cassettes and on receipt of a valid cash withdrawal request from a customer, notes are extracted from the cassettes and transported to a cash dispenser slot in a user console. An ATM is generally capable of dispensing notes of several different denominations and separate cassettes are normally provided for notes of each particular denomination.

It is desirable that when the number of currency notes remaining within a particular cassette in the ATM reaches a predetermined critical low level, (i.e. a level which may not be sufficient to guarantee that a typical customer cash withdrawal request can be successfully fulfilled using the notes remaining in that particular cassette) indication is provided. Such an indication is typically provided by a sensor comprising a permanent magnet associated with a pusher assembly which is arranged to urge notes towards an exit end of the cassette from which they are extracted. When the pusher assembly reaches a position in the proximity of the exit end, a reed switch mounted within the ATM is activated by the permanent magnet to indicate that the number of notes within the cassette has reached a predetermined low level. The reed switch is commonly positioned so that a low level indication will be given when approximately 75 to 100 notes remain within the cassette.

The cassette will then typically be replaced by a new full cassette.

During a replenishment operation, cassettes are removed from the ATM by an operator. However, for security reasons, such cassettes are normally replaced by prepared full cassettes and are returned to a financial institution, often at a location remote from the ATM, for replenishment. Each cassette returned to the bullion center will need to be opened and emptied and the content reconciled against the ATM journal. Such multiple cassette handling is inefficient, costly and time-consuming, as all the cassettes must be emptied and their contents checked before replenishment takes place.

The handling of non-empty multiple currency cassettes is also undesirable due to the security risks involved, including the risk that the cassettes may be tampered with before replenishment takes place.

SUMMARY OF THE INVENTION

The present invention is concerned with providing ATM replenishment in which the above mentioned difficulties are alleviated.

According to a first aspect of the present invention, there is provided an automated teller machine (ATM) including a plurality of storage devices each for storing currency notes; means for dispensing notes from one or more storage device to authorized users; removable secure receptacle means for receiving currency notes; and means for automatically transferring remaining currency notes from the storage devices to the receptacle means to empty said storage devices to allow replenishment thereof.

Further according to the invention there is provided a method for allowing replenishment of an automated teller machine (ATM) having a plurality of storage devices each for storing currency notes the method including the steps of determining when the number of notes falls to a replacement level, and thereafter transferring remaining notes from the storage devices in an automatic sequence to removable secure receptacle means to allow the storage devices to be extracted for replenishment.

BRIEF DESCRIPTION OF THE DRAWINGS

The invention will now be described by way of example with reference to the accompanying drawings, in which.

DETAILED DESCRIPTION

Figure 1:
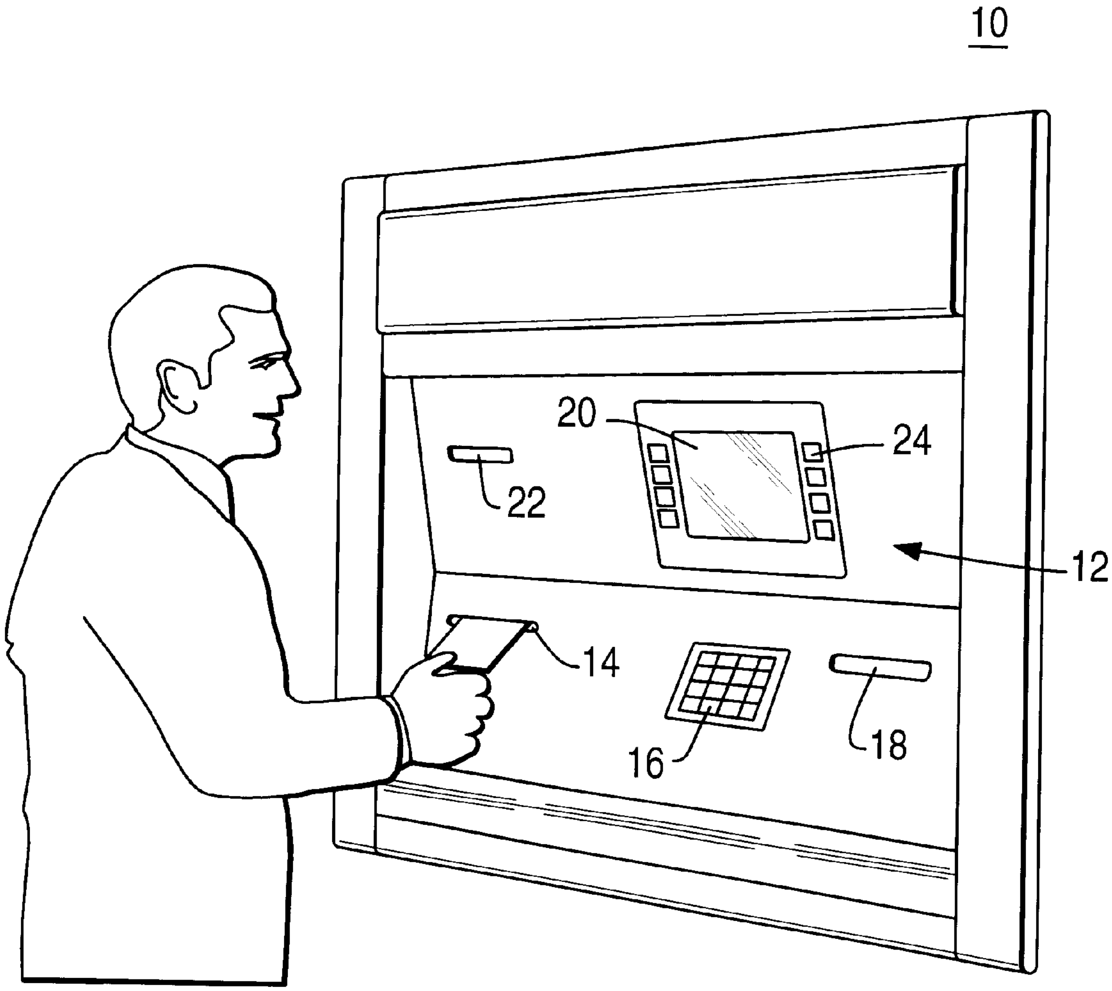
FIG. 1 is an external perspective view of an automated teller machine (ATM) embodying the invention.

As shown in FIG. 1, the front of an ATM 10 is provided with a user panel 12 including a card reader slot 14 for insertion of a user's identification card, a key pad 16, a cash dispenser slot 18 through which bank notes are delivered to a user, a display screen 20 and a receipt printer slot 22 through which a receipt for a transaction is delivered to the user at the end of a transaction. The card reader, cash dispenser and receipt printer modules associated with the respective slots 14, 18 and 22 in the user panel 12 of the ATM 10, are designated by the same reference numerals in FIG. 2. In a typical ATM transaction, a user inserts his or her card into the card reader slot 14 and data encoded on the card is read. Instructions are then displayed on the screen 20. The user is requested to enter a personal identification number (PIN) on the key pad 16 which is verified, usually at a central location remote from the ATM 10. If the PIN is determined to be correct against information read from the inserted card, a menu of the various facilities available to the user is then displayed on the screen 20. If a cash withdrawal facility is selected, the user is requested to enter the sum required on the key pad 16 or by means of additional keys 24 provided at the side of the screen 20.

Figure 2:
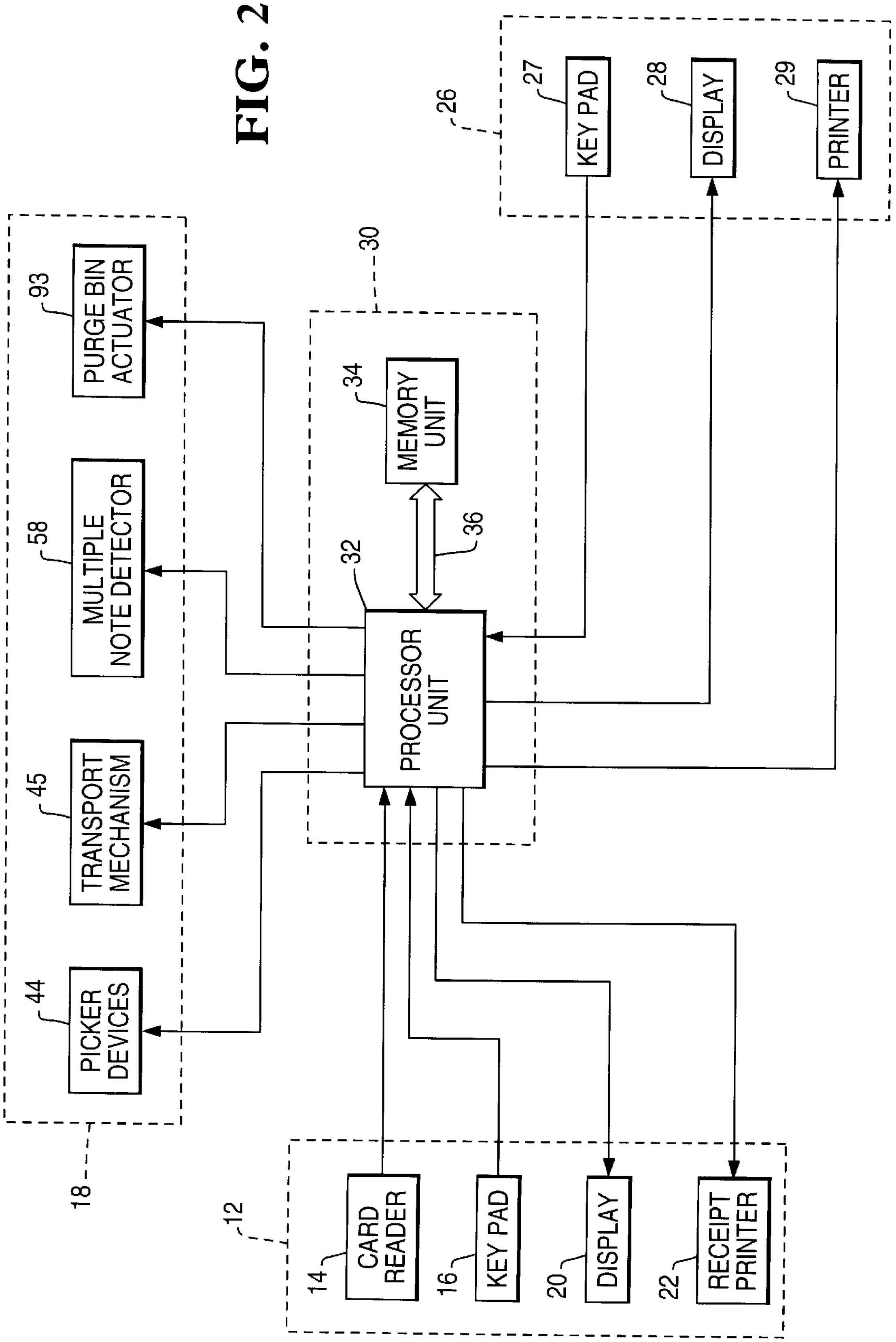
FIG. 2 is block diagram representation of the ATM of FIG. 1.

As shown in FIG. 2, the ATM 10 includes a controller unit 30 which communicates with components of the user panel 12, with an operator panel 26 mounted inside the ATM (not available to a customer) and with various other operating mechanisms of the ATM 10. The operator panel 26 includes a key pad 27, a display screen 28 and a printer 29. The controller unit 30 includes a processor unit 32, and a memory unit 34 connected via a bus line 36 to the processor unit 32. The processor unit 32 receives input signals from the card reader 14, the user panel key pad 16 and the operator panel key pad 27, and provides output signals to various mechanisms of the cash dispenser 18, to the displays 20 and 28 of the user and operator panels 12 and 26, and to the user panel receipt printer 22 and the operator panel printer 29. It should be understood that the processor unit 32 controls the amount of cash dispensed by the cash dispenser 18, the information displayed on the displays 20 and 28 and the information printed by the printers 22 and 29.

The various mechanisms within the cash dispenser 18 controlled by the processor unit 32 include a multiple note detector 58 (see also FIG. 3) for detecting the presence of multiple superposed bank notes, vacuum operated picker devices 44 for picking notes from currency cassettes 40, a transport mechanism 45 for transporting notes picked from one or more of the cassettes 40, and a purge bin actuator 93 for a purge bin 90. The processor unit 32 may include a microcomputer, and the memory unit 34 may be a non-volatile RAM. Suitable computers and memories are readily available in the marketplace. Their structure and operation are well known and therefore will not be described.

The main operating parts of the cash dispenser 18 embodying the invention will now be described with particular reference to FIG. 3. Stacks of bank notes 38 are held in the cassettes 40, the cassettes being slidably mounted in compartments 42 and each holding notes of different denominations. The picker devices 44 serve to extract notes from each cassette 40. The transport mechanism 45 is associated with three feed paths 46, 48 and 91 linked by a diverter 93 and serves to transfer notes from one location to another within the ATM 10. The diverter 93 is not normally actuated and the normal note dispensing path is from the cassettes 40 via paths 46 and 48 to the dispenser. The diverter 93 is controlled by the controller unit 30 to pivot into a second position only when it is necessary to empty partially filled cassettes into the purge bin 90, prior to replenishment, as described below. Then path 91 is utilized.

Hence in normal operation, the transport mechanism 45 transfers notes picked from the cassettes 40 along a first unidirectional feed path 46, to the second unidirectional feed path 48 for delivery to a customer. A diverter 56 is provided along the first feed path 46 to direct any mispicked notes which are detected by the multiple note detector 58 into a first reject bin 60.

A stacking wheel 62 and stripper plate assembly 70 are provided at the end of the second feed path 48, for stacking notes prior to being delivered to a customer through the cash dispenser slot 18 via a series of co-operating belts 80, 82, 84 and 86. The stacking wheel 62 comprises a plurality of stacking plates 64, spaced apart in parallel relationship along the shaft 66 of the stacking wheel 62, each stacker plate 64 incorporating a series of curved tines 68 which pass between fingers 72 of the stripper plate assembly 70 rockably mounted on a shaft 74. A reject bin 76 is provided for notes which are retracted from the cash dispenser slot 18, in the event a customer omits to remove them therefrom at the end of a cash withdrawal transaction.

The arrangement described will operate as normal until a low level indication is provided concerning the notes in one or more cassettes such that the cassettes need replenishing.

In such circumstances an authorized operator can select the cassette purge command to cause each cassette to be emptied into the purge bin. An odometer 94 will count the notes as they travel along path 91 into the secure segregated purge bin. The number of notes will also be recorded in the journal.

Following emptying of the cassettes, they can be removed and on receipt by the bullion center can be immediately reloaded without requiring emptying and reconciling of each cassette. Only the purge bin requires emptying and reconciling so cutting down time and personnel requirements. The security of operation can be maximized as only the purge bin need be subjected to valuable media protection special treatment. Typically the purge bin could handle 200 notes or more within its enclosure.

When notes are to be transferred from the cassettes 40 to the purge bin 90, the notes are extracted from the cassettes 40 by the picker devices 44 and are fed along the first unidirectional feed path 46 via diverter 93 to path 91 via rollers 95 as described above. Any mispicked notes detected by the detector 58 are directed to the reject bin 60 via diverter 56 in the manner described above.

Alternatively the detector 58 can be switched off and all notes passed to the purge bin.

Figure 3:
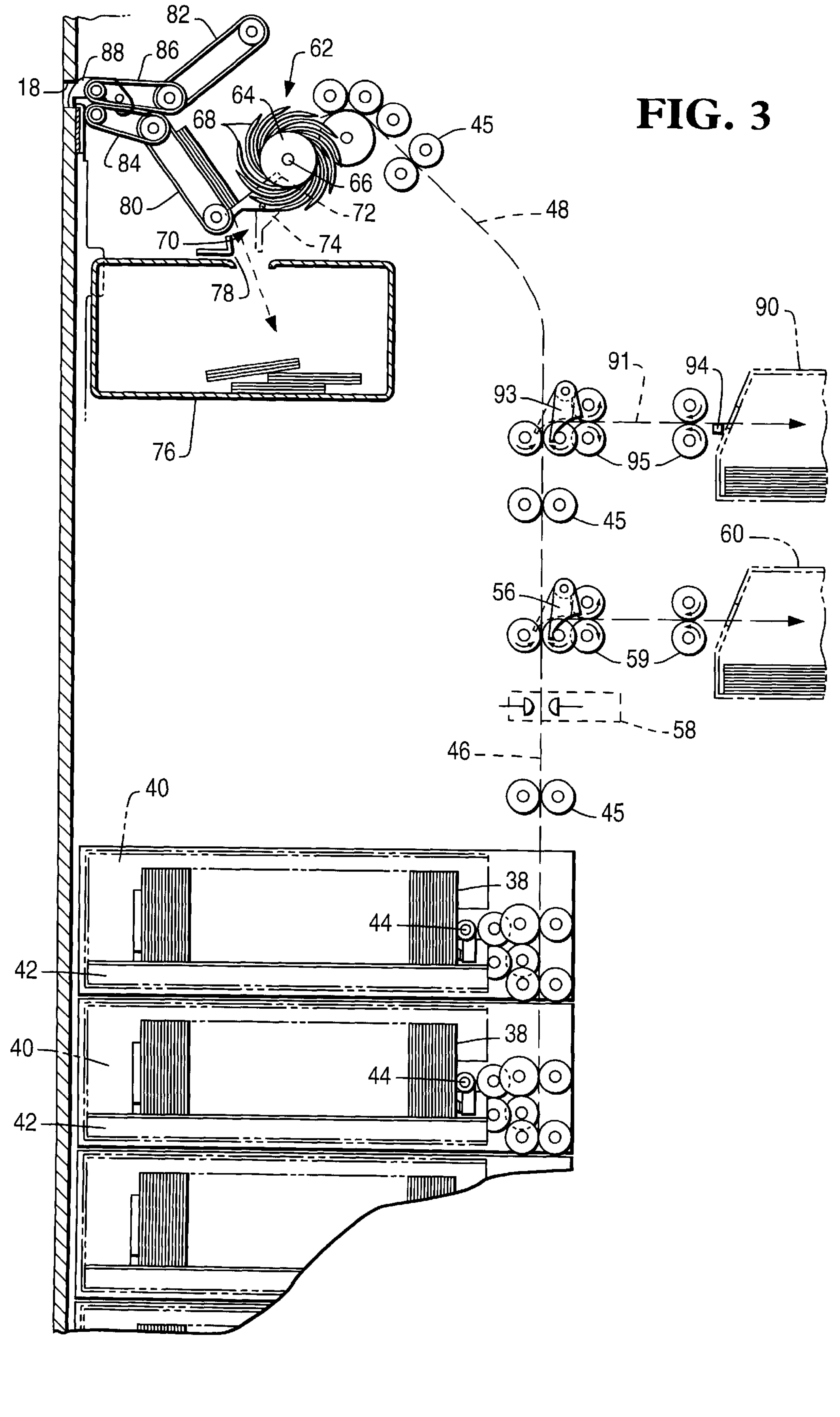
FIG. 3 is a diagrammatic representation of the main operating parts of a cash dispenser of the ATM of FIG. 1.
Figure 4:
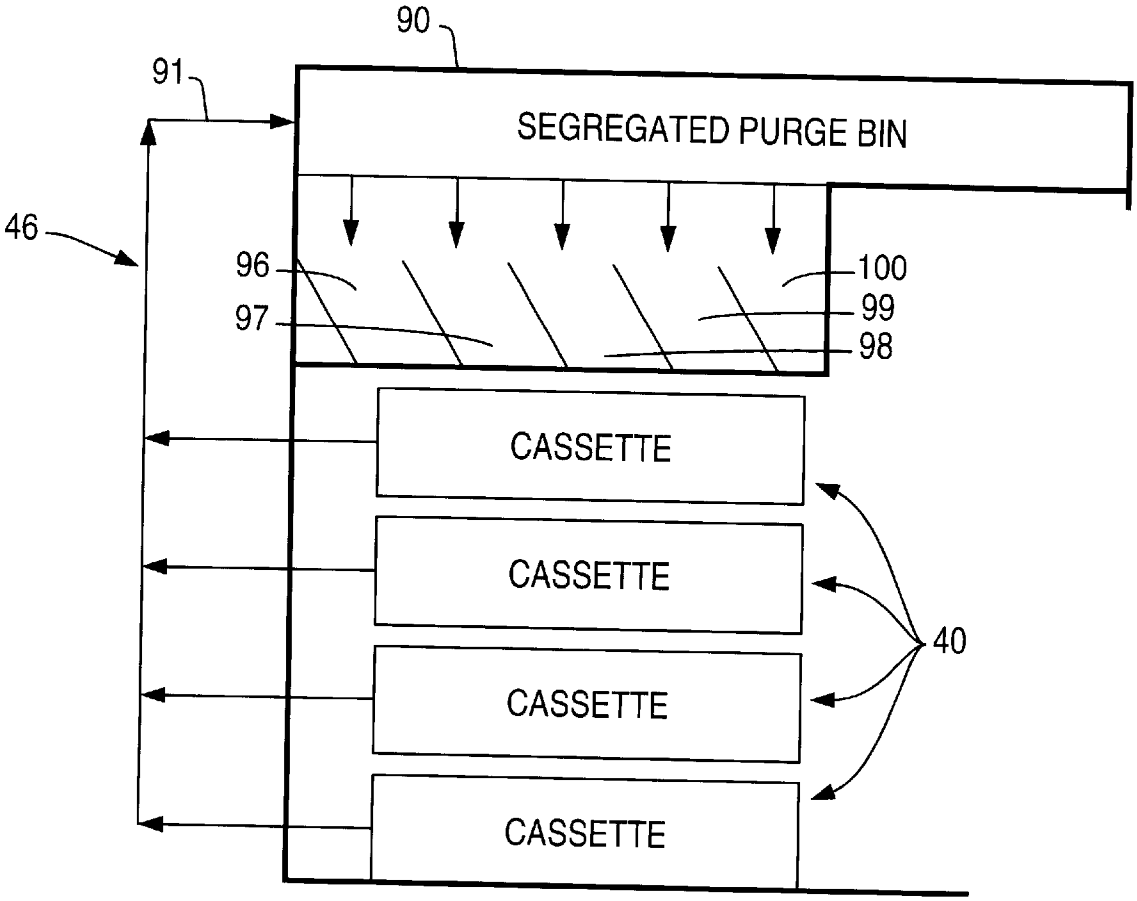
FIG. 4 is a diagrammatic view of a purge bin storage device used in the FIG. 3 arrangement.

The purge bin 90 of FIG. 3 is shown in simplified form but in practice will typically include a segmented arrangement as shown in FIG. 4. In this arrangement the bin 90 includes a plurality of segments 96–100. The banknotes from any one cassette are arranged to be deposited in a particular one of the segments to allow the speeding up or checking for example or emptying. Purged and retracted notes could be handled each with their own compartments in the same bin. Diverters (e.g. similar to those in FIG. 3) can be employed to select the current segment for deposit in the purge bin.

Figure 5:
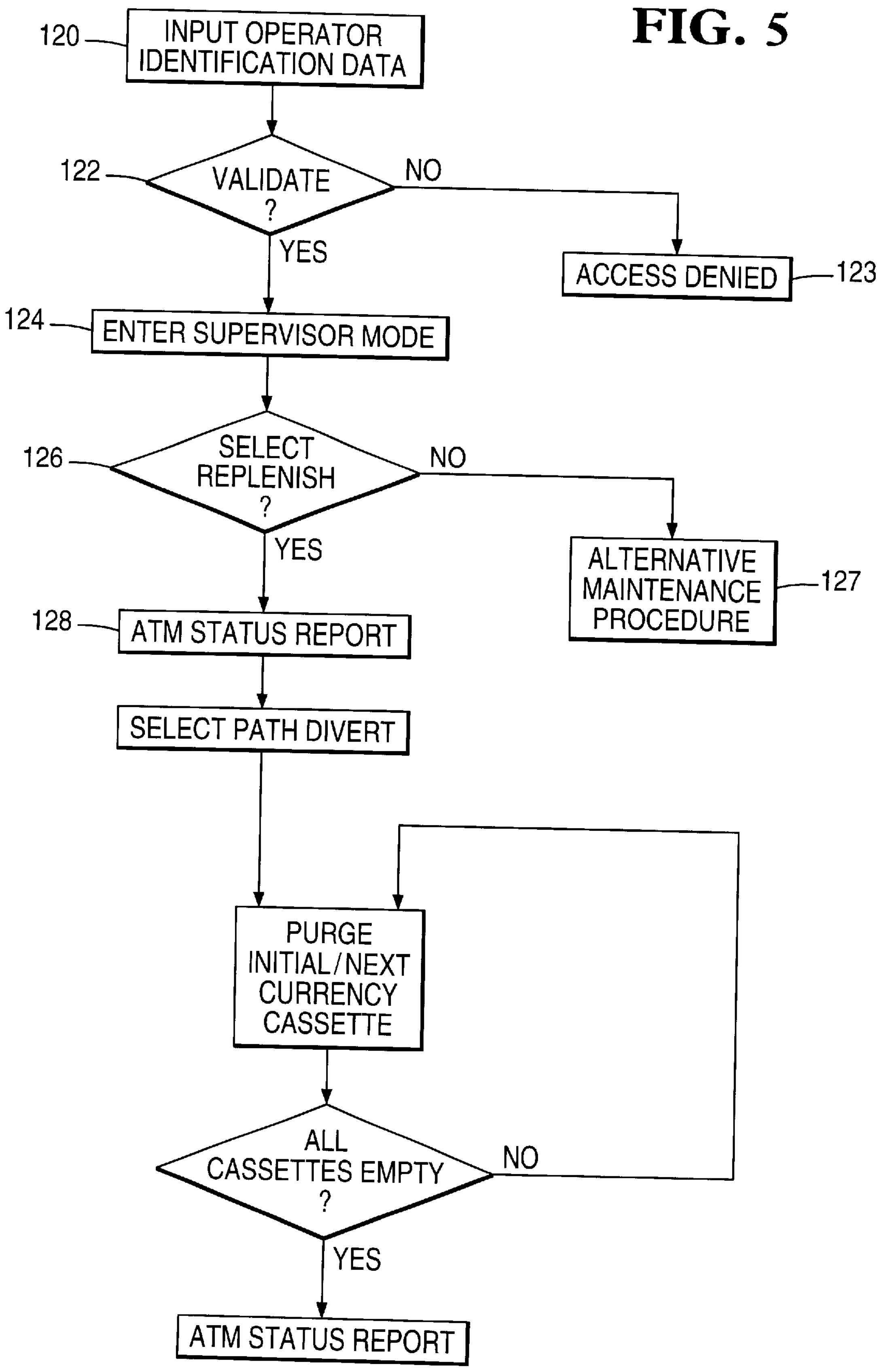
FIG. 5 is a flow diagram representing a purging operation of the cash dispenser of FIG. 3.

In order to carry out the replenishment, the purge sequence can be effected under the processor control 32 by steps shown in the flowchart of FIG. 5.

Following low cassette level indication, the authorized operator will need to gain access via access controls and actuation of replenishment will cause the cassettes to be purged as indicated until emptying with appropriate status reports before and after purging to ensure reconciliation is correct.

What is claimed is:

1. An automated teller machine (ATM) comprising:

a plurality of cassettes each for storing currency notes;

means for transporting notes unidirectionally from one of said cassettes;

a removable secure purge bin for receiving currency notes;

a diverter mechanism for diverting currency notes from said transporting means unidirectionally along a unidirectional path to the purge bin; and a processor for controlling the diverter mechanism to transfer remaining currency notes from the cassettes to the purge bin to empty the cassettes to allow replenishment thereof.

2. The automated teller machine as claimed in claim 1, wherein the purge bin includes a common enclosure having a plurality of segmented sections each for receiving currency notes from a cassette.

3. The automated teller machine as claimed in claim 1, further comprising a counter mechanism for counting a number of currency notes passed to the purge bin.

4. The automated teller machine as claimed in claim 1, wherein the diverter mechanism is controlled to select a path of currency notes from a dispensing operation to a purge bin transfer operation.

5. The automated teller machine as claimed in claim 1, further comprising an indicator mechanism for indicating a low level of currency notes in at least one of the cassettes.

6. A method of allowing replenishment of an automated teller machine (ATM) having a plurality of storage devices each for storing currency notes, the method comprising the steps of:

determining when a number of currency notes in said storage devices falls to a replacement level; and transferring remaining notes from the storage devices unidirectionally in an automatic sequence along a unidirectional path to a removable secure receptacle to allow the storage devices to be extracted for replenishment.

7. The method as claimed in claim 6, wherein the transferring step includes the step of transferring notes from each storage device into a respective segmented storage area within the receptacle.

8. The method as claimed in claim 6, further comprising the step of counting a number of currency notes passed to the receptacle.

9. The method as claimed in claim 6, wherein the transferring step includes the step of selecting a path of the currency notes from dispensing mode to receptacle transfer mode.

10. A method of allowing replenishment of an automated teller machine (ATM) having a plurality of cassettes each for storing currency notes, the method comprising the steps of:

determining when a number of currency notes in said cassettes falls to a replacement level and providing a signal indicative thereof; and controlling a mechanism in response to the signal to unidirectionally transfer remaining notes from the cassettes along a unidirectional path to a removable secure purge bin to allow the cassettes to be extracted for replenishment.

11. The method as claimed in claim 10, wherein the controlling step includes the step of transferring notes from each cassette into a respective segmented storage area within the purge bin.

12. The method as claimed in claim 10, further comprising the step of counting a number of currency notes passed to the purge bin.

13. The method as claimed in claim 10, wherein the controlling step includes the step of selecting a path of the currency notes from dispensing mode to purge bin transfer mode.

14. A program storage medium readable by a computer having a memory, the medium tangibly embodying one or more programs of instructions executable by the computer to perform method steps for allowing replenishment of an automated teller machine (ATM) having a plurality of storage devices each for storing currency notes, the method comprising the steps of:

determining when a number of currency notes in said storage devices falls to a replacement level; and transferring remaining notes from the storage devices unidirectionally in an automatic sequence along a unidirectional path to a removable secure receptacle to allow the storage devices to be extracted for replenishment.

15. An automated teller machine comprising:

a dispenser slot;

a plurality of cassettes for correspondingly holding currency notes of different denominations;

means for transporting said notes unidirectionally from said cassettes to said slot for dispensing to a customer;

a purge bin;

means for determining when said notes in one of said cassettes falls in number to a replacement level; and means for selectively emptying unidirectionally along a unidirectional path into said purge bin notes remaining in said cassettes when partially filled to said replacement level.

16. The machine according to claim 15, wherein said purge bin has a common enclosure and is removably mounted in said machine for receiving said notes of different denominations from said plurality of cassettes.

17. The machine according to claim 16, wherein said purge bin includes a plurality of compartments for correspondingly receiving said notes of different denominations from said plurality of cassettes.

18. The machine according to claim 16, further comprising means for counting notes emptied into said purge bin.

19. The machine according to claim 16, further comprising:

an exposed user panel including a card reader slot, key pad, and display screen for controlling dispensing of said notes by a user; and an operator panel hidden inside said machine and including a second key pad and second display screen for controlling said selective emptying of said partially filled cassettes by an operator.

20. The method Of using said automated teller machine according to claim 15 comprising:

dispensing notes from said cassettes until said replenishment level is determined;

emptying notes from said partially filled cassettes into said purge bin;

removing said empty cassettes from said machine;

reloading said empty cassettes with notes for subsequent use; and emptying said purge bin in a secure operation and reconciling said notes removed therefrom.

* * * * *